May 9, 1950     W. A. MARSHALL, JR     2,507,113
HEATING APPARATUS

Filed Sept. 7, 1945     5 Sheets-Sheet 3

Inventor:
William A. Marshall, Jr.
By Williams, Bradbury & Hinkle
Attorneys

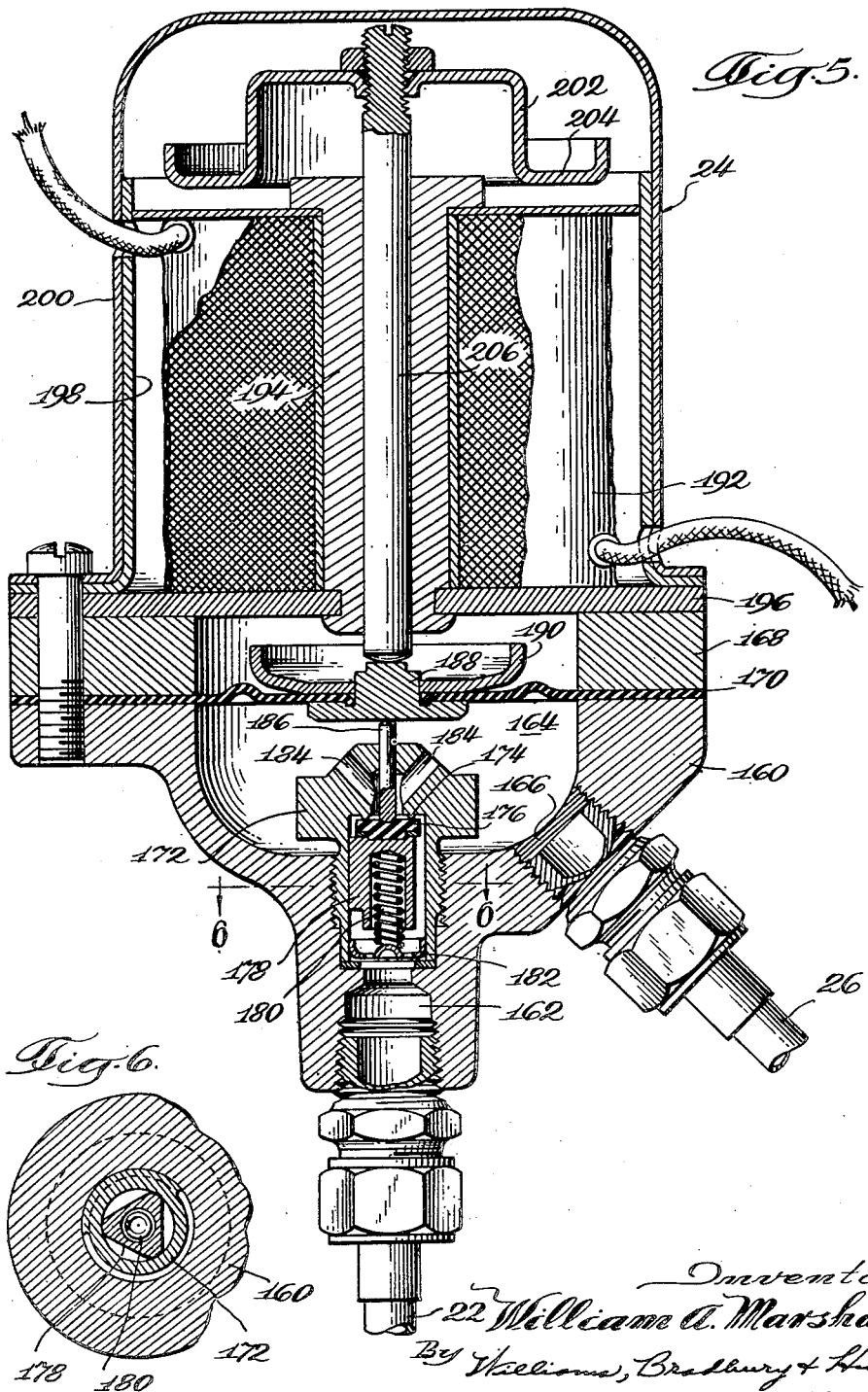

Patented May 9, 1950

2,507,113

UNITED STATES PATENT OFFICE 2,507,113

HEATING APPARATUS

William A. Marshall, Jr., Chicago, Ill., assignor to Stewart-Warner Corporation, Chicago, Ill., a corporation of Virginia Application September 7, 1945, Serial No. 615,040

7 Claims. (Cl. 237—7)

This invention relates to heating apparatus and more particularly to heating systems designed for use in automotive vehicles having internal combustion engines.

One object of the invention is to provide an auxiliary water heating apparatus for use in connection with the circulatory cooling system of an internal combustion engine and adapted to raise the temperature of the liquid in the system independently of the heat radiated by the operation of the engine.

In connection with such a system, it is also an object of the invention to provide an extended surface heat exchanger for transferring heat from the water of the system to ventilating air flowing to the passenger compartment or other space of the vehicle requiring heat.

Another object of the invention is to provide new and improved heating apparatus applicable to the circulatory system of an internal combustion engine and having automatic control means serving to start and stop the operation of said heating apparatus in accordance with the temperature requirements of the system.

A further object of the invention is to provide an auxiliary heating apparatus including a water jacket connected into the circulatory system of an internal combustion engine, and having heat exchange means for the transfer of heat to a stream of ventilating air which is thus enabled to receive heat either from the operation of the engine or from the operation of the auxiliary heating apparatus independent of the engine or from both sources to provide for the heating of an adjacent space to which the air is conducted.

More specifically, the invention provides an internal combustion heater, including a substantially cylindrical combustion chamber with a water jacket in two parts, one immediately in contact with the combustion chamber, and the other in the form of a jacket of annular cross section spaced from the first part, providing a passage between the two parts for a stream of ventilating air to which heat is transferred from the water in the jacket.

An additional object of the invention is to provide a unitary structure containing an internal combustion heater, a water jacket, and providing a passage or passages for ventilating air in heat exchange relation to the water jacket, together with connections for coupling the water jacket into the circulatory cooling system of an internal combustion engine.

Other objects and advantages of the invention will appear from the following description and from the accompanying drawings considered in connection therewith.

In the drawings:

Fig. 5 is a vertical sectional view on an enlarged scale showing the internal mechanism of the magnetic fuel control valve for a burner;

Fig. 6 is a horizontal detail section taken as indicated at line 6—6 on Fig. 5.

Figure 1:
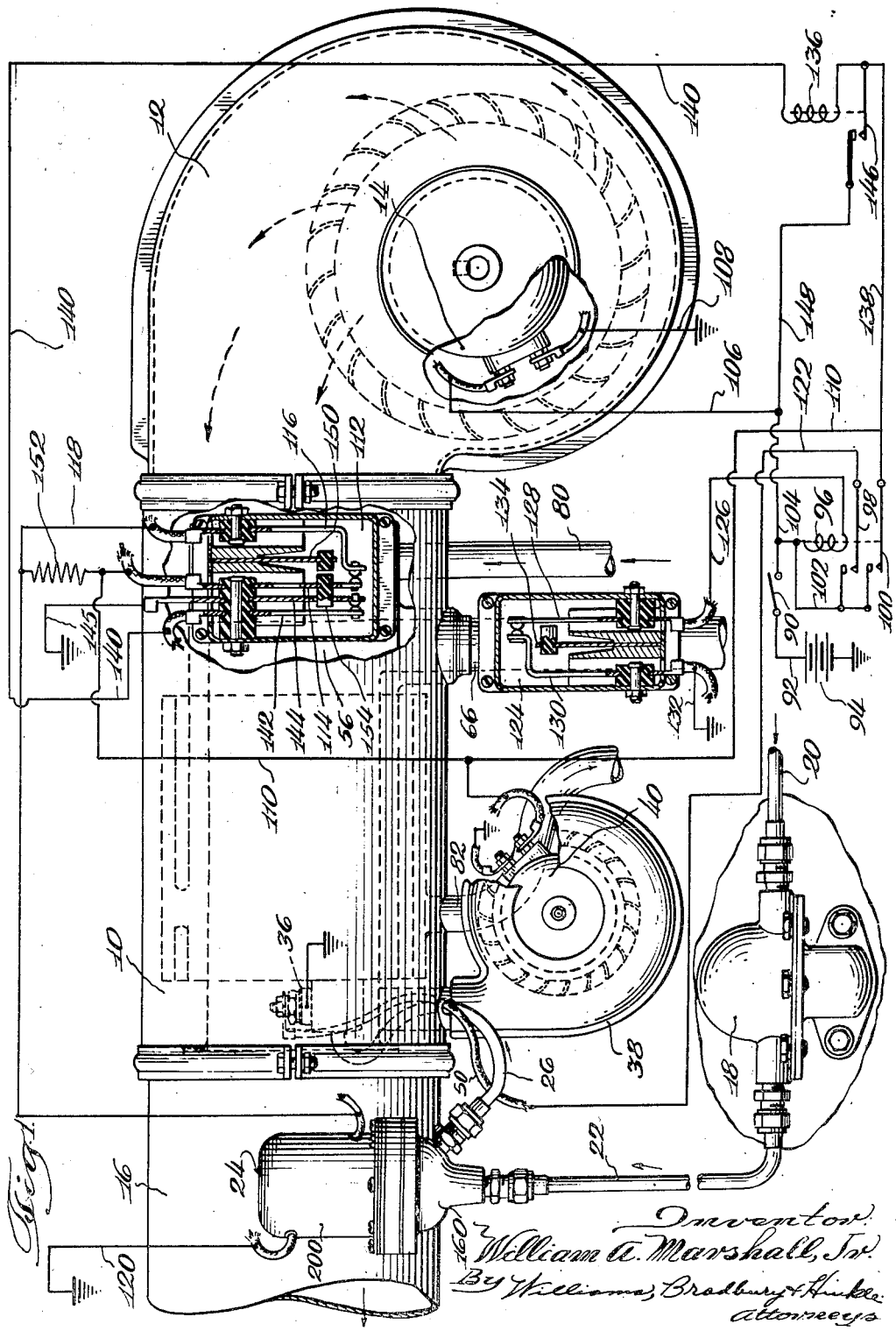
Fig. 1 is a side elevation partly in section showing a heating apparatus embodying this invention.

The apparatus shown in the drawings includes an internal combustion heater with means for feeding ventilating air through the heater, this air being employed as a vehicle for carrying heat to the space to be warmed, as, for example, the passenger compartment of a motor vehicle. The heater therefore includes a heat exchanger in which the ventilating air absorbs heat from the products of combustion and in the present apparatus there is combined with the heat exchanger and with the heater itself a water jacket arranged to be connected into the circulation of the liquid cooling system of an internal combustion engine such as the motor of the vehicle on which the apparatus is installed. This permits the ventilating air to be heated by the hot water circulating through the jacket when the engine is running and makes it possible to provide the desired quantity of heat for maintaining the ventilating air at proper temperature by operating the internal combustion heater for this purpose when the engine is not running or when the temperature outdoors is so low that there is not enough surplus heat in the water of the engine cooling system to maintain the ventilating air at a comfortable temperature.

Figure 2:
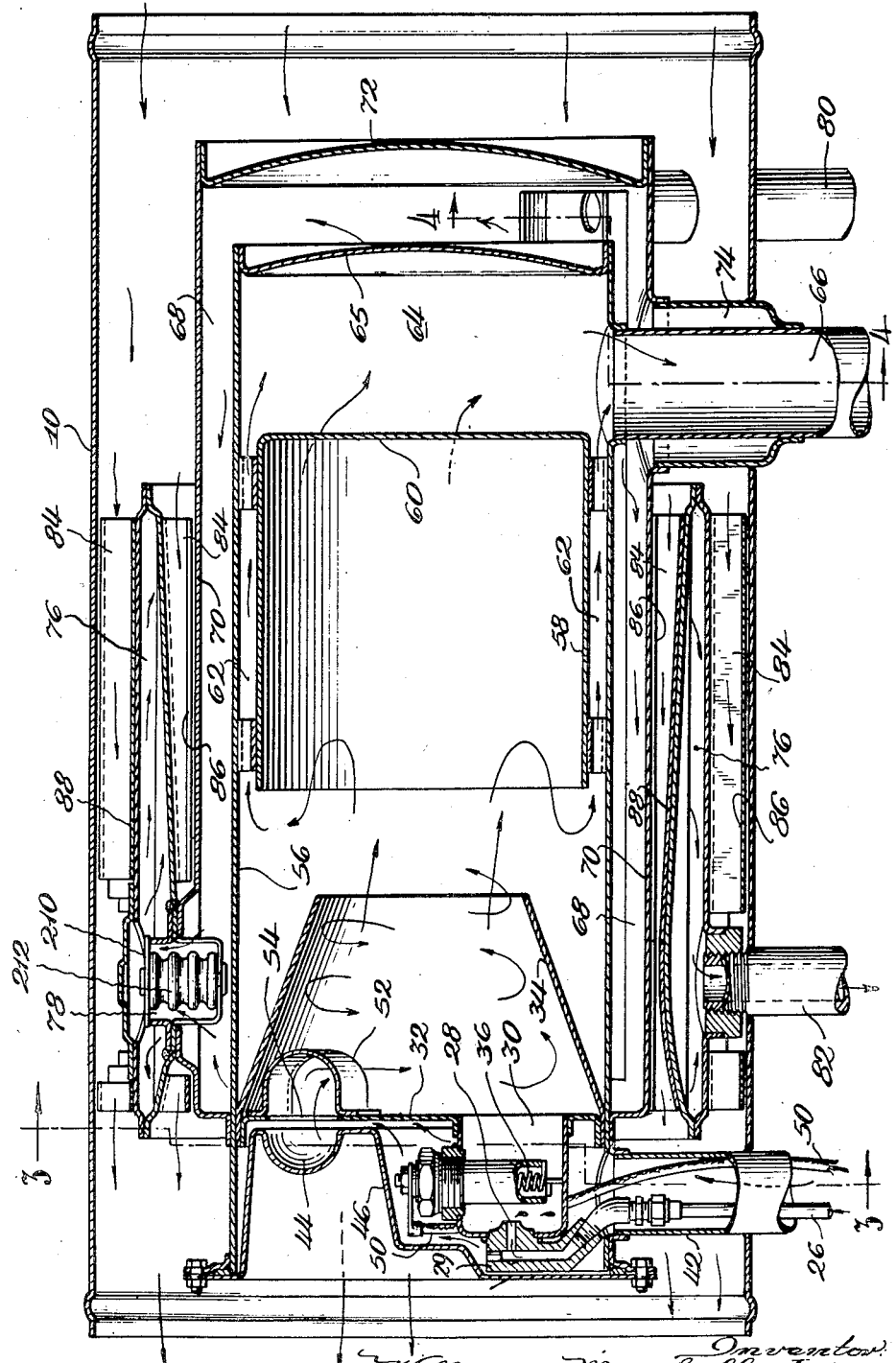
Fig. 2 is a vertical axial sectional view of the internal combustion burner and heat exchanger of the apparatus.
Figure 3:
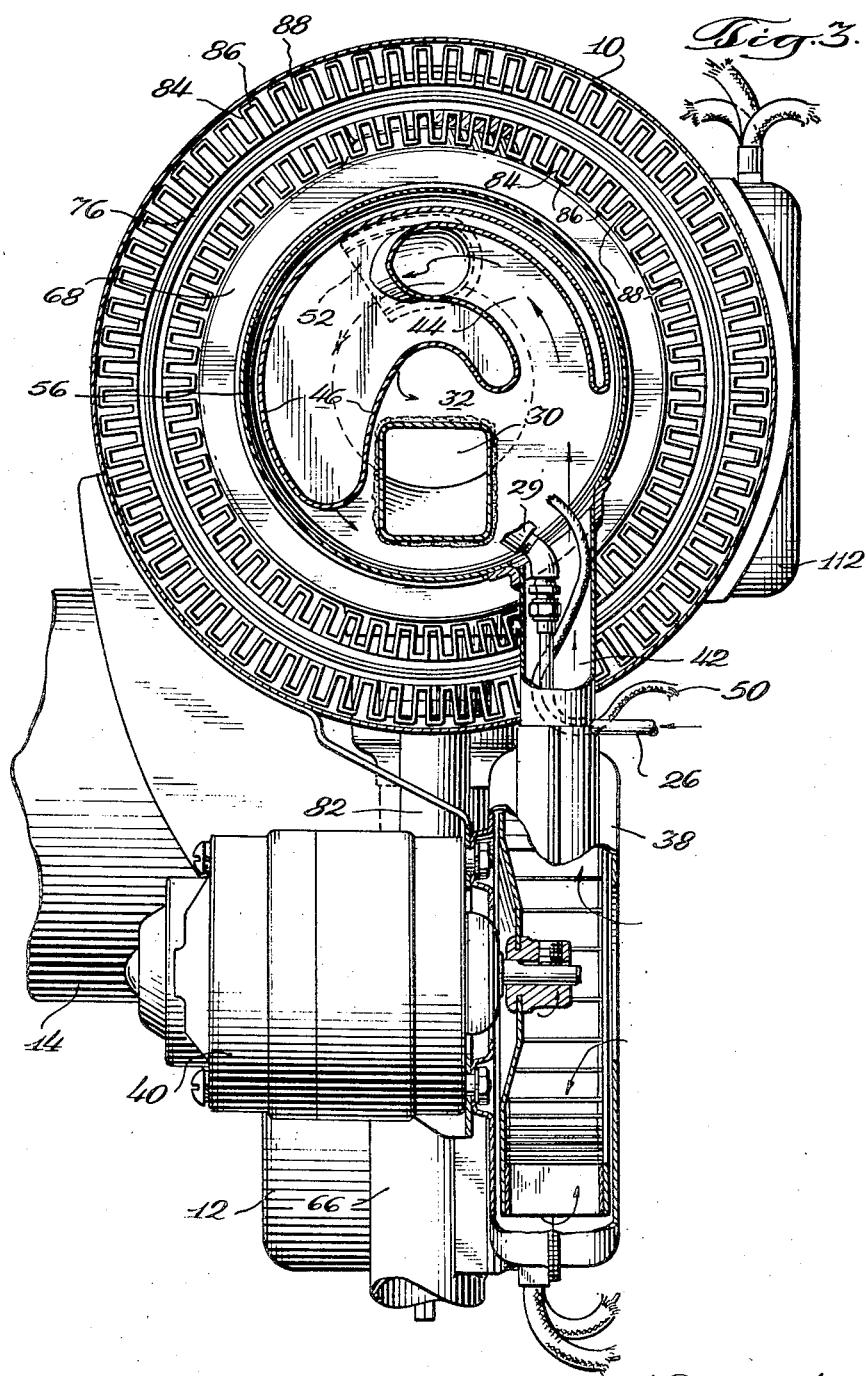
Fig. 3 is a transverse vertical section taken substantially as indicated at line 3—3 on Fig. 2.
Figure 4:
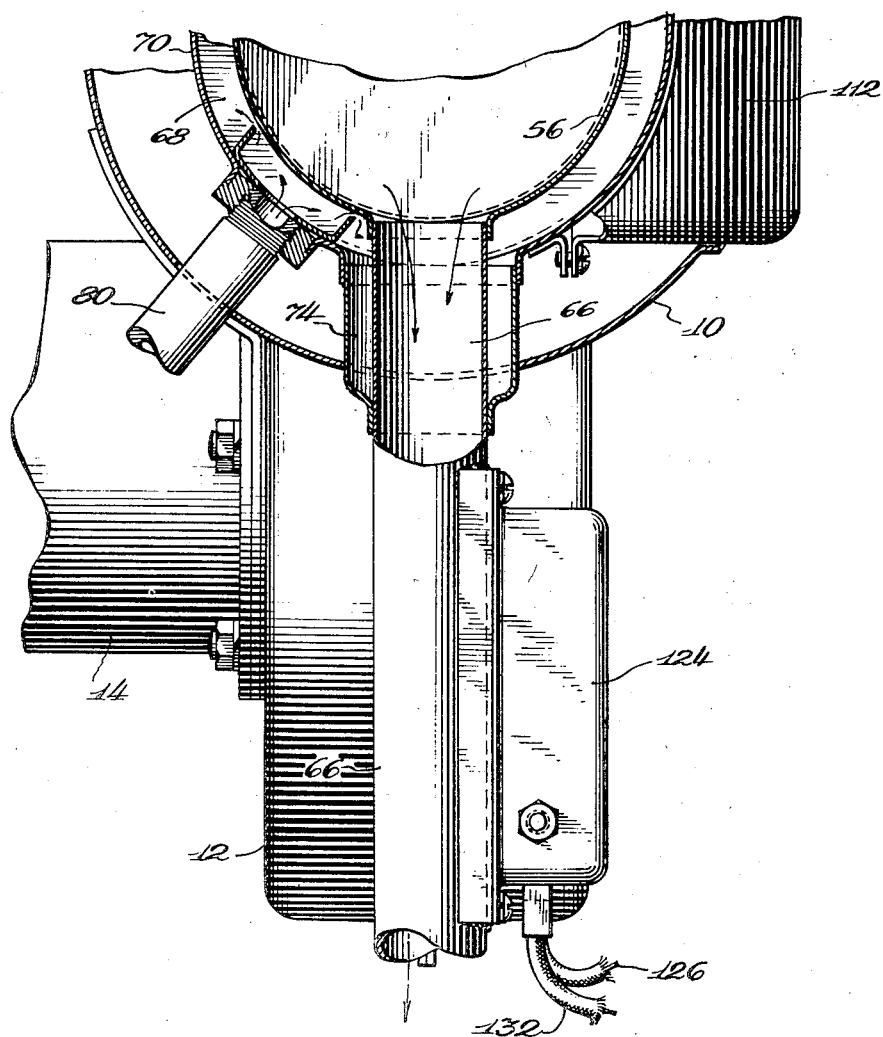
Fig. 4 is a vertical sectional view taken as indicated at line 4—4 on Fig. 2.

Fig. 1 shows a cylindrical casing 10 in which the main burner structure is housed together with the heat exchanger and water jacket just mentioned. A blower 12 is coupled to one end of the casing and is arranged to be driven by an electric motor 14 for providing a stream of ventilating air which passes through the heater and is discharged through any suitable conduit such as that shown at 16 in Fig. 1. Liquid fuel for the heater is provided by a mechanically driven pump 18 which may be driven by the vehicle engine or, if desired, by a separate electric motor (not shown) in order that fuel may be supplied to the heater when the vehicle engine is not running. The fuel inlet pipe 20 may be understood as extending from a suitable fuel tank (not shown) and the fuel is delivered by the pump 18 through a pipe 22 which is connected to the magnetic fuel control device 24 hereinafter more fully described. From the control device 24 a fuel pipe 26 leads to an outlet 28 in a fitting 29 as seen in Fig. 2. This outlet 28 discharges into a pocket 30 formed in the end wall 32 of the burner space of the heater which is further defined by a truncated conical wall 34 tapering away from the pocket 30. An igniter 36 of the electrically energized incandescent type is mounted in the pocket 30 for initially igniting the fuel delivered from the outlet 28, and air for admixture to the fuel is supplied by a blower 38 driven by an electric motor 40 and discharging through an air pipe 42 which connects into a curved passage 44 as seen in Fig. 3. The passage 44 is formed partly in a specially shaped cover member 46 which overlies the end wall 32 of the burner space and provides an enclosing covering for the fitting 29 which contains the outlet 28 and is connected with the fuel pipe 26. The cover 46 also encloses the outer end of the igniter 36 to which its lead wire 50 is connected. The terminal portion of the passage 44 is formed by a hoodlike member 52 which overlies an opening 54 in the end wall 32 and this terminal is positioned as indicated in dotted outline in Fig. 3 so as to discharge air tangentially into the conical space defined by the wall 34. The whirling motion of the air thus set up within the burner space entrains and vaporizes the liquid fuel discharged from the outlet 28 and either the liquid or a portion of the combustible vapor is readily ignited by contact with the incandescent element 36. Combustion proceeds from the burner space into the combustion chamber 56 in which the products of combustion flow first into an inner cylindrical shell 58 having a closed end wall 60 but open at its opposite end toward the burner space within the conical wall 34. The products of combustion are thus reversed in their direction and escape from the shell 58 by way of the annular passage 62 between the wall 58 of said shell and the wall 56 of the combustion chamber. From this annular space the hot gases pass into the space 64 in the end of the combustion chamber and are discharged through an exhaust pipe 66 shown leading downwardly therefrom.

Immediately surrounding the cylindrical wall 56 of the combustion chamber is a water jacket 68 having a cylindrical wall 70 and an end wall 72 which is spaced from the end wall 65 of the combustion chamber as seen in Fig. 2. The jacket also includes a portion 74 encompassing part of the exhaust pipe 66 which is disposed within the outer casing 10. A second water jacket 76 of annular cross section encircles the jacket 68 but in spaced relation thereto and spaced inwardly from the wall of the casing 10 so as to provide conduits for ventilating air which flows longitudinally through the casing 10. The water jacket 68 is connected to the water jacket 76 by a passage 78. Water enters the jacket 68 through an inlet pipe 80 which may be connected to the water jacket of the internal combustion engine with which the apparatus is associated, and the water, circulating through the jacket 68, passage 78 and outer jacket 76, returns to the circulatory system of the engine through an outlet pipe 82 leading from the jacket 76 as seen in Fig. 2. This pipe may be connected to the water circulating pump which is usually provided in the engine cooling system but which is not illustrated herein.

The ventilating air supplied by the blower 12 and moving longitudinally through the casing 10 absorbs heat from the wall 70 of the inner jacket 68 and from both walls of the outer jacket 76. Preferably, these walls of the jacket 76 are fitted with longitudinally extending radiating fins which may be formed as shown in Fig. 3 of more or less continuous sheet metal sections providing the radial fins proper indicated at 84 with portions 86 connecting adjacent fins and foot portions 88 contacting the walls of the jacket 76 and secured thereto as by brazing or welding. These square-bent zig-zag sections of sheet metal thus occupy the air passages of annular cross section inside and outside the water jacket 76 and insure the efficient transfer of heat from the water to the air flowing through the casing 10. Thus, whether the water is heated by combustion in the chamber 56 or by the internal combustion engine by virtue of the circulation through pipes 80 and 82, the transfer of heat from the water takes place as air is caused to flow through the casing 10 and is discharged into the passenger compartment of the vehicle or other space to be heated.

The present invention includes control devices for causing automatic actuation of the heater and its appurtenances in a manner to maintain the flow of ventilating air substantially at a predetermined temperature; it may be understood that with this type of regulation the heat actually furnished to the compartment of the vehicle by way of the outlet conduit 16 may be controlled by providing a suitable valve or damper (not shown) in the outlet of that passage; then if the supply of heated air becomes excessive the outlet can be partially closed off, thus retarding the flow of air and causing the air flowing through the heat exchanger to be raised to the maximum temperature at which the operation of the heater is automatically discontinued. If preferred, suitable means (not shown) may be provided for varying the speed of the blower 12 as a method of controlling the rate at which heat is delivered to the compartment, or other methods for controlling the final temperature of the compartment may be employed as desired. The heater is first placed in operation by closing the main switch 90 which is connected by a conductor 92 with a source of electrical energy indicated at 94 as a battery and having one terminal grounded. Closing the switch 90 energizes the relay coil 96 which closes switches 98 and 100, connecting both of them with the battery 94 through conductor 102. The closing of the switch, 90 establishes a circuit through conductors 104 and 106 for the motor 14 of the blower 12, one of the motor leads being grounded at 108. The closing of the switch 100 provides a circuit through conductor 110 for the motor 40 of the combustion air blower 38 and the conductor 110 extends also to one terminal of the high-low heat thermostat 112. When the thermostat is cool, all of its contacts are closed; hence, the circuit initially includes the blade 114, blade 116, and conductor 118 which extends to one terminal of the magnetic fuel control valve 24, the other terminal of said valve being grounded at 120. Energizing the valve device 24 opens the fuel line permitting flow of the fuel through pipes 22 and 26 to the outlet 28 as already described.

The closing of the switch 98 establishes a circuit from the battery 94 through conductor 122 which connects as shown with the terminal wire 50 of the igniter 36. The circuit through the relay coil 96 is initially maintained by the igniter thermostat 124. The conductor 126 leads from the coil 96 to the blade 128 of said thermostat which is initially in contact with blade 130, the latter being grounded at 132. Said thermostat 124 is mounted on the exhaust pipe 66 and its bimetallic heat responsive arm 134 is adapted to respond to the temperature of the exhaust pipe 66 resulting from the establishment of combustion in the burner space and in the chamber 56 so that soon after combustion is started the arm 134 swings to the right as seen in Fig. 1 and separates the blade 128 from the blade 130, thus opening the circuit through the relay 96. This causes the switch 98 to open, disconnecting the igniter 36 from the battery 94 since the electric ignition is no longer required.

However, when the relay coil 96 is de-energized, the switch 100 also is opened, which would stop the motor 40 of the combustion air blower 38 if special provision were not made to prevent this. Such provision includes a holding relay 136 which is energized when the switch 100 is initially closed by the relay 96, the circuit extending from the switch 100 through conductor 138, holding relay coil 136, conductor 140, contact blade 142 of the high-low heat thermostat and blade 144 thereof which is grounded at 145. This circuit through the holding coil 136 is thus maintained as long as the blades 142 and 144 remain in contact and the coil 136 operates to close a switch 146 which provides a holding circuit for the motor 40, leading from the battery 94 and main switch 90 by way of conductor 104 and the conductor 148 through switch 146, conductor 138 and conductor 110, so that the opening of the switch 100 will not stop the operation of the combustion air blower 38. The holding relay 136 also maintains a circuit for the fuel control valve 24 by way of conductor 110, blades 114 and 116 of the high-low thermostat, and conductor 118.

The thermostat 112 is mounted as shown in Fig. 1 on the wall 70 of the water jacket 68 near the end of the jacket to which the inlet pipe 80 is connected. When the temperature of this portion of the wall 70 reaches a predetermined minimum value the heat responsive bimetallic arm 150 will be flexed to the left as seen in Fig. 1 and will thus force the blade 114 out of contact with the blade 116, breaking the connection between the conductor 110 and the conductor 118. This restricts the current to the path provided by a resistance element 152 connected in shunt across the terminals of the blades 114 and 116, thus increasing the resistance of the circuit through the control valve 24 and causing the valve to restrict the flow of fuel to the outlet 28 in a manner about to be described. As a result, the rate of combustion is reduced, and may be reduced sufficiently to prevent a further increase in the temperature at the thermostat 112. However, if by reason of comparatively limited requirements for heat the temperature at this point continues to rise after the reduction in the rate of combustion, the arm 150 will be flexed still farther to the left acting through the insulating block 154 on the blade 114 to force the blade 142 out of engagement with the blade 144. This opens the circuit through the conductor 140 and holding relay coil 136 causing the switch 146 to open and de-energizing the combustion air motor 40, and the fuel control device 24 so that its valve completely closes and shuts off the supply of fuel to the outlet 28. The operation of the burner is thus arrested at a predetermined maximum temperature at which the thermostat 112 is adjusted to open the circuits as described. As the temperature falls in the vicinity of the thermostat 112, the contact blades 142 and 144 will be re-engaged and at a lower temperature the contact blades 114 and 116 will come together as the heat responsive arm 150 returns to its original position as shown in Fig. 1. After this, whenever the temperature of the exhaust pipe 66 drops sufficiently to permit closing of the contacts 128 and 130, the relay 96 will be re-energized, again closing the switches 98 and 100 and causing repetition of the burner cycle as already described.

The fuel control valve device 24 is specifically the subject matter of the application of John H. Leslie, II, and George W. Allen, Serial Number 577,234, filed February 10, 1945, but to clarify the operation of the present structure a brief description thereof is here included, with reference to Figs. 5 and 6. The base casting 160 of the device 24 has a threaded inlet passage 162 into which the fuel feed pipe 22 is connected and which leads to a fuel chamber 164 having a threaded outlet 166 into which the pipe 26 is connected. The base 160 is surmounted by a ring member 168, and a flexible diaphragm 170 is clamped between the parts 160 and 168 forming a top wall for the fuel chamber 164. A fitting 172 is screwed into the upper end of the inlet passage 162 and provides a downwardly facing annular seat 174 for a valve member 176 carried on a slidable body 178 of triangular cross section, as indicated in Fig. 6. A spring 180 pocketed in the body 178 urges the valve 176 toward its seat, the lower end of the spring resting upon a perforated sheet metal cup 182 secured in the fitting 172.

The upper end of the fitting 172 is provided with diverging outlet passages 184 which admit the fuel flowing past the valve 176 into the fuel chamber 164 from which it flows through the pipe 26 to the outlet port 28, but such flow can take place only when the valve 176 is spaced from its seat 174 to a greater or less degree. The unseating of the valve is effected by a pin 186 slidably carried in the upper end of the fitting 172 and engaging the underside of a contact button 188 secured in the center of the diaphragm 170. The diaphragm is clamped between the head of the button 188 and a cupped disc 190 permanently secured to the bottom.

Surmounting the ring 168 is the electromagnetic device which actuates the valve 176. This is in the form of a solenoid including a coil 192 surrounding a magnetic core 194 which has its lower end secured in a base plate 196 which is also of magnetic material. The coil 192 is enclosed in a sleeve 198 of magnetic material encased by a cover 200 of non-magnetic material such as brass or aluminum. Thus, when the coil 192 is energized, the core 194 becomes one pole of a magnet while the upper end of the sleeve 198 becomes an opposite pole of annular form with an annular air gap between the poles. An armature 202 of inverted cup form is mounted with its marginal portion 204 in the air gap between the poles of the magnet and is provided with a non-magnetic stem 206 preferably of brass or aluminum. The stem 206 rests upon the button 188 and when the coil 192 is energized the armature 204 and the stem 206 are drawn downward, depressing the button 188 and the rod 187 to open the valve 174. The solenoid, exerting a force proportioned to the voltage impressed upon it, urges the valve toward fully open position but is opposed by the pressure of the fuel in the chamber 164, acting against the underside of the diaphragm 170 in a direction to permit the valve to close. The pressure of the fuel supplied by the pump is thus balanced against the force of the solenoid and this varies directly with the impressed voltage. In the present apparatus either the current is supplied at full strength to admit the fuel at a maximum pressure for maximum operation of the burner, or a reduced current is supplied through the resistance 152 to admit the fuel at reduced pressure with a corresponding reduced rate of fuel feed to the burner.

With the water jackets 68 and 76 connected to the cooling system of an internal combustion engine, there will be times when the water in the jackets will be maintained at a sufficiently high temperature to furnish to the ventilating air stream all of the heat required for maintaining a comfortable temperature in the passenger compartment of the vehicle. At such times the ventilating air blower 12 will continue to operate if the main switch 90 is left closed, but the heat control thermostat 112 will prevent operation of the burner. In order to maintain the water in the jackets 68 and 76 within desirable temperature limits, the rate of flow through the jackets from the circulatory system of the engine is rendered variable by the provision of a valve 210 positioned to control the passage 78 which connects the jacket 68 with the jacket 76. A temperature responsive bellows of the Sylphon type is shown at 212 mounted in the passage and arranged to open the valve 210 to a varying degree depending upon the temperature of the water in the passage 78. As the temperature of the water rises, the valve 210 will gradually open, permitting the water to circulate at an increasing rate. When the engine is not operating or is not furnishing the full amount of heat required to maintain the proper temperature of the ventilating air, the burner will be automatically started through the agency of the thermostatic controls already described and the water in the jackets 68 and 76 will be circulated by convection through the engine cooling system and at a rate controlled by the valve 210.

While there is shown and described herein certain structure embodying this invention, it is to be understood that the invention is not limited thereto or thereby but may assume numerous other forms and that it includes all modifications, variations and equivalents coming within the scope of the claims.

I claim:

1. In a heating unit for use in conjunction with the circulatory cooling system of an internal combustion engine, the combination comprising an internal combustion heater which includes a combustion chamber, a water jacket comprising a first portion in direct heat exchange relation with a wall of said combustion chamber and a second portion spaced from and encompassing the first portion with a passage connecting said portions, a valve controlling said passage, and heat responsive means in the passage operative to hold said valve closed until the water in the first portion of the jacket is heated to a predetermined temperature.

2. In a heating unit as defined in claim 1, said connecting passage being located at substantially the highest portion of the water jacket.

3. In a heating unit for use in conjunction with the circulatory cooling system of an internal combustion engine, the combination comprising an internal combustion heater which includes a combustion chamber, a water jacket comprising a first portion in direct heat exchange relation with a wall of said combustion chamber and a second portion spaced therefrom with a passage connecting said portions, said portions of the water jacket being substantially cylindrical and coaxial, the space between them serving as a ventilating air passage, and means to provide a flow of air through said space.

4. In a heating unit for use in conjunction with the circulatory cooling system of an internal combustion engine, the combination comprising an internal combustion heater which includes a combustion chamber, a water jacket comprising a first portion in direct heat exchange relation with a wall of said combustion chamber and a second portion spaced therefrom with a passage connecting said portions, the space between said portions serving as a passage for ventilating air to be heated by contact with said portions of the water jacket, an inlet passage connecting the engine circulatory system with said first portion of the water jacket, an outlet passage connecting the second portion of the jacket with said system, and thermostatic means responsive to the temperature of the water adjacent said inlet passage and controlling the operation of the heater.

5. In a heating unit for use in conjunction with the circulatory cooling system of an internal combustion engine, the combination comprising an internal combustion heater which includes a combustion chamber, a water jacket comprising a first portion in direct heat exchange relation with a wall of said combustion chamber and a second portion spaced therefrom with a passage connecting said portions, said portions of the water jacket being substantially cylindrical and coaxial, with longitudinally extending fins projecting across the space between said water jacket portions for transferring heat to a stream of ventilating air flowing through said space.

6. In a heating unit for use in conjunction with the circulatory cooling system of an internal combustion engine, the combination comprising an internal combustion heater which includes a combustion chamber, a water jacket comprising a first portion in direct heat exchange relation with a wall of said combustion chamber and a second portion spaced therefrom with a passage connecting said portions, said portions of the water jacket being substantially cylindrical and coaxial, and a cylindrical casing surrounding said second jacket portion in spaced relation thereto, the spaces inside and outside said second portion of the water jacket serving as flow passages for streams of ventilating air.

7. In a heating unit for use in conjunction with the circulatory cooling system of an internal combustion engine, the combination comprising an internal combustion heater which includes a combustion chamber, a water jacket comprising a first portion in direct heat exchange relation with a wall of said combustion chamber and a second portion spaced therefrom with a passage connecting said portions, said portions of the water jacket being substantially cylindrical and coaxial, and a cylindrical casing surrounding said second jacket portion in spaced relation thereto, the spaces inside and outside said second portion of the water jacket serving as flow passages for streams of ventilating air with longitudinally extending, heat-radiating fins projecting into said air flow passages in approximately radial relation to the walls of said water jacket.

WILLIAM A. MARSHALL, JR.

REFERENCES CITED

The following references are of record in the file of this patent:

UNITED STATES PATENTS

| Number | Name | Date |
| --- | --- | --- |
| 1,270,877 | Schultz | July 2, 1918 |
| 2,213,656 | Pinkerton | Sept. 3, 1940 |
| 2,225,023 | Watt | Dec. 17, 1940 |
| 2,270,824 | Meyerhofer | Jan. 20, 1942 |
| 2,300,010 | Rose | Oct. 27, 1942 |
| 2,300,011 | Rose | Oct. 27, 1942 |
| 2,348,834 | Mueller | May 16, 1944 |
| 2,354,345 | Wintergreen | July 25, 1944 |
| 2,369,993 | Turner | Feb. 20, 1945 |